United States Patent [19]

Rayner

[11] 3,966,432

[45] June 29, 1976

[54] LIQUID ABRASIVE COMPOSITIONS CONTAINING A SILICATE SUSPENDING AGENT

[75] Inventor: George Geoffrey Rayner, Eccles, England

[73] Assignee: Colgate-Palmolive Company, New York, N.Y.

[22] Filed: June 14, 1974

[21] Appl. No.: 479,328

[30] Foreign Application Priority Data

July 6, 1973 United Kingdom .............. 32367/73

[52] U.S. Cl. ........................................ 51/308; 106/3

[51] Int. Cl.[2] ...................... C04B 31/16; C09C 1/68

[58] Field of Search ............................ 51/308; 106/3

[56] References Cited

UNITED STATES PATENTS

| | | | |
|---|---|---|---|
| 1,965,299 | 7/1934 | Patterson | 51/308 |
| 2,275,049 | 3/1942 | Keller | 51/308 |
| 2,944,879 | 7/1960 | Allen et al. | 51/308 |
| 3,020,140 | 2/1962 | Bluth et al. | 51/308 |
| 3,089,764 | 5/1963 | Gorman | 51/308 |

*Primary Examiner*—Donald J. Arnold
*Attorney, Agent, or Firm*—Steven J. Baron; Murray M. Grill; Herbert S. Sylvester

[57] ABSTRACT

There is disclosed a liquid abrasive composition comprising an aqueous suspension of a substantially water-insoluble particulate abrasive, a nonionic surfactant and a suspending agent selected from natural and synthetic clays, hydrophobically treated clays, fumed silica, magnesium montmorillonite, and complex magnesium aluminum silicates.

12 Claims, No Drawings

LIQUID ABRASIVE COMPOSITIONS CONTAINING A SILICATE SUSPENDING AGENT

This invention relates to abrasive compositions in liquid form for cleaning hard surfaces, for domestic or industrial use.

It is an object of the invention to provide a storage stable, pourable suspension of finely divided water-insoluble abrasive material in an aqueous liquid medium, the product having good detergent, lathering, grease emulsifying and abrasive properties.

By hard surfaces is meant, for example, stainless steel, resin type surfaces such as those sold under the trade mark FORMICA, ceramics and vitreous enamel.

The compositions are not intended for use on softer surfaces such as ordinary paintwork, except possibly for rubbing down prior to repainting.

According to the present invention a liquid abrasive composition comprises an aqueous suspension of a substantially water-insoluble particulate abrasive, a nonionic surfactant and a suspending agent.

The particle size of the abrasive component is such as to give effective abrasive action without undue scratching of the surface to be cleaned. A typical particle size giving a satisfactory abrasive performance is such that substantially the whole of the particulate material, when dry, passes through a sieve with apertures of 104 microns and at least 80% by weight passes through a sieve with apertures of 53 microns.

The preferred abrasive material is calcite (ground marble) but others, such as silica, felspar, pumice, kieselguhr and labradorite will serve.

All proportions given below are by weight.

An abrasive component content of 25 – 60% has been found suitable, about 55% being the preferred content. If less than about 25% abrasive is used the viscosity of the suspension may fall below that required to maintain the material in suspension. If more than about 60% abrasive is used then the product becomes a paste and ceases to be pourable.

Nonionic surfactants useful in the compositions of the invention include fatty acid mono- and dialkylolamides such as coconut diethanolamide, and condensation products of lower alkylene oxides such as ethylene oxide with alkyl phenols, fatty acids, fatty alcohols or fatty acid amides.

Examples of nonionic surfactants include monoethers of polyethylene glycols and long chain alkanols in which the alkanol has 10 to 16 carbon atoms and the polyethylene glycol has 5 to 15 oxyethylene units. Such monoethers of polyethylene glycol are generally made by reacting the alkanol with ethylene oxide. Preferably the proportion of ethylene oxide is in the range of from 60 to 65%. A particularly suitable product is made by reacting 11 mols of ethylene oxide and 1 mol of a mixture of $C_{14}$ and $C_{15}$ straight chain normal primary alkanols, said mixture having an average of 14 – 15 (e.g. about 14.5) carbon atoms, which product is sold in U.S.A. under the name "Neodol 4511". Alternatively one may use another otherwise identical product in which the mol ratio is 13:1 instead of 11:1 ("Neodol 4513") or a similar product such as an adduct of 7 mols of ethylene oxide and 1 mol of a mixture of alkanols of 12 to 15 carbon atoms ("Neodol 25-7"). Another nonionic detergent is an ether of polyethylene glycol and a blend of $C_{16}$–$C_{18}$ alcohols, containing about 60% or about 65% ethylene oxide ("16181618-60" or "Alfonic 1618-65"). Still another nonionic detergent is a condensation product of long chain alkanol, propylene oxide and ethylene oxide known as "Plurafac B26".

Other examples are the reaction product of isooctyl phenol with 6 to 30 ethylene oxide units; condensation products of alkyl thiophenols with 10 to 15 ethylene oxide units; condensation products of higher fatty alcohols such as tridecyl alcohol with ethylene oxide; addends of monoesters of hexahydric alcohols and inner ethers thereof such as sorbitan monolaurate, sorbitol mono-oleate and mannitan monopalmitate with ethylene oxide (e.g. about 60 mols); and condensation products of polypropylene glycol with ethylene oxide.

It has been found that among the nonionics, mono- and dialkylolamides are the most suitable, coconut diethanolamide being most preferred. Mixtures of different nonionics may be used.

A nonionic surfactant content of 3 – 8% has been found suitable, 4 – 5% being preferred. The use of more than about 8% nonionic surfactant can result in a gelled structure not suitable for the present purpose.

The suspending agent is preferably of the clay type. Various natural and synthetic clays may be used. Suitable natural clays include attapulgite and bentonite. An example of a synthetic clay is an inorganic complex silicate clay having the formula $(Si_8Mg_{5.1}\ Li_{0.6}H_{7.6}O_{24})^{0.6-}Na^{+}0.6$. This suspending agent is similar in constitution to the mineral Hectorite but substantially free of undesirable quartz and dolomite impurities which contaminate Hectorite. Several grades of the synthetic clay are available as "Laponite" (LAPONITE is a registered trademark of Laporte Industries Limited). Laponite gives a thixotropic effect resulting in a slight increase in viscosity of the composition on standing, which is reversable by agitation of the composition. Mixtures of different suspending agents may be used.

Other useful suspending agents are the finely divided hydrophobically treated clays such as a reaction product of a clay such as bentonite, hectorite or Laponite with, for example, dimethyldistearyl ammonium chloride. These suspending agents are the hydrophobically treated montmorillonite or hectorite clays available under the trademark "Bentone" which are prepared by reacting a clay such as bentonite or hectorite in a cation exchange system with a variety of amines. Different amines are reacted to obtain different Bentone suspending agents which may also differ in proportions of $SiO_2$,$MgO$ and $Al_2O_3$. Examples of useful Bentone suspending agents are Bentone-27, which is a stearaluminum hectorite, Bentone-34, which is quaternium 18 bentonite, Bentone-38, which is quaternium 18 hectorite, and Bentone-14, which is a clay extended quaternium 18 hectorite, all of which have a particle size of below about 5 microns and are commercially available from the NL Industries, Inc.

The hydrophobic clays should be thoroughly dispersed. Three forms of energy which aid in such dispersion are temperature increase, chemical energy and mechanical shearing action. Chemical energy can be supplied in the form of a polar additive such as alcohol or a high boiling organic liquid such as propylene carbonate. Propylene carbonate, usually in an amount of about 0.05% to about 0.5%, is also particularly helpful when the organic liquid has poor wetting properties, or when dispersion is unusually difficult. As taught by NL Industries in their Data Sheet B-33 of April 1970, high mechanical shearing action is also an important factor. Equipment such as homogenizers, shear pumps, and colloid mills will give positive results. Examples of useful mixers include, among others, the Cowles Dissolver and the Eppenbach Homogenizer.

Other suitable suspending agents include fumed silica, available, for example, under the trade names "Cab-O-Sil", "Aerosil" and "Gar-O-Sil"; magnesium montmorillonite, available under the trade name Ben-A-Gel; and complex magnesium aluminium silicate, available under the trade name "Veegum".

It has been found desirable to include the suspending agent in a range of 0.25 – 1%, preferably the minimum amount found to be necessary in any particular formulation to maintain the abrasive in suspension. Such minimum amounts will often be in the range 0.3–0.5%.

A humectant may be included in the composition to prevent drying out of the composition. Glycerine and sorbitol are suitable examples of humectants and may be used in proportions from 0.5 – 5% of the composition, 2% being preferred.

Coloring agents, perfumes, bleaching agents, germicides and other additives may also be included in the composition as may be required or desirable. These may be of any suitable types.

The aqueous medium will generally be predominantly water.

The preferred method of preparation of compositions according to the present invention is to disperse the suspending agent in water, then mix in the particulate abrasive and finally mix in the nonionic surfactant, the mixing preferably being carried out at a temperature of about 50°C.

Other preparation sequences are feasible but may be less satisfactory as they can result in an overaerated composition.

The following Examples illustrate the invention.

EXAMPLES 1 – 3

These Examples are compositions in which a single nonionic surfactant is used. The compositions consist of 55% of calcite abrasive, and 45% of liquid media having the following compositions.

| | Ex. 1 | Ex. 2 | Ex. 3 |
|---|---|---|---|
| Nonyl phenol + 9 moles ethylene oxide (EO) | 11.1 | — | — |
| Lauric myristic diethanolamide (LMDEA) | — | 11.1 | — |
| Coconut diethanolamide (CDEA) | — | — | 11.5 |
| "Laponite SP" | 1.1 | 1.1 | 1.1 |
| Water | to 100 | to 100 | to 100 |

EXAMPLE 4

This Example is a composition in which a humectant is employed to retard drying out of the surface of the product on storage. It is similar to the composition of Example 2 except that 9% of the water is replaced by sorbitol.

EXAMPLES 5 – 8

These Examples are compositions in which a mixture of nonionic surfactants is used. The compositions consist of 55% calcite abrasive, and 45% of liquid media of following compositions:

| | Ex. 5 | Ex. 6 | Ex. 7 | Ex. 8 |
|---|---|---|---|---|
| $C_{10}$–$C_{12}$ fatty alcohol + 5 moles EO | 4.45 | — | — | — |

-continued

| | Ex. 5 | Ex. 6 | Ex. 7 | Ex. 8 |
|---|---|---|---|---|
| LMDEA | 6.7 | 2.1 | 1.8 | 4.45 |
| CDEA | — | 8.9 | 7.1 | — |
| Nonyl phenol + 9 moles EO | — | — | — | 6.7 |
| "Laponite SP" | 1.1 | 1.1 | 1.1 | 1.1 |
| Water | to 100 | to 100 | to 100 | to 100 |

EXAMPLE 9

This Example is a composition containing 55% labradorite and 45% of a liquid medium having the same composition as that of Example 6

EXAMPLE 10

This Example is a composition similar to Example 9 but containing 55% of fine silica instead of the labradorite.

EXAMPLE 11

This Example is a composition containing 50% of calcite, and 50% of a liquid medium containing:

| | |
|---|---|
| Sorbitol | 4.0 |
| CDEA | 8.0 |
| LMDEA | 2.0 |
| "Laponite SP" | 1.0 |
| Water | to 100.0 |

EXAMPLES 12 – 15

These Examples are compositions in which different suspending agents are used in mixtures comprising 55% calcite and 45% of liquid media having the following compositions:

| | Ex. 12 | Ex. 13 | Ex. 14 | Ex. 15 |
|---|---|---|---|---|
| CDEA | 8.9 | 8.9 | 8.9 | 8.9 |
| LMDEA | 2.1 | 2.1 | 2.1 | 2.1 |
| Sorbitol | 4.45 | 4.45 | 4.45 | 4.45 |
| "Ben-A-Gel" | 1.1 | — | — | — |
| "Cab-O-Sil" | — | 1.1 | — | — |
| "Laponite SP" | — | — | 0.67 | — |
| "Veegum" | — | — | — | 1.1 |

EXAMPLES 16 – 17

These Examples are compositions containing germicides and contain 55% calcite, 45% of a liquid medium containing 8.9% CDEA, 2.1% LMDEA, 1.1% "Laponite SP" together with the following germicides and perfumes + water to 100%.

| | | |
|---|---|---|
| Example 16 | p-chloro-m-cresol | 0.2% |
| Example 17 | di-chloro m-xylmol | 0.2% |
| | Pine oil | 1.1% |

EXAMPLE 18

This Example is a composition which contains a bleaching agent and is based on a product as described in Examples 16 and 17 except that the germicides have been replaced by 2.2% sodium hypochlorite with corresponding adjustment of the water content of the liquid medium.

The products of all the Examples were satisfactory abrasive compositions having good detergent, lathering, grease-emulsifying and abrasive properties, and were pourable liquids in which the abrasive remained in stable suspension when the compositions were tested by being allowed to stand undisturbed for a period of four weeks at room temperature.

I claim:

1. A liquid abrasive composition comprising an aqueous suspension of about 25–60% of a substantially waterinsoluble particulate abrasive, about 3–8% of a nonionic surfactant and about 0.25–1.0% of suspending agent selected from natural and synthetic clays, hydrophobically treated clays, fumed silica, magnesium montmorillonite, and complex magnesium aluminum silicates.

2. A liquid abrasive composition as claimed in claim 1 wherein the particulate abrasive is of such particle size that, when dry, substantially all of it will pass through a sieve with apertures of 104 microns and at least 80% by weight passes through a sieve with apertures of 53 microns.

3. A liquid abrasive composition as claimed in claim 1 the abrasive of which is selected from calcite, silica and labradorite.

4. A liquid abrasive composition as claimed in claims 1 the nonionic surfactant of which is selected from dialkylolamides, condensation products of lower alkylene oxides with alkyl phenols, and mixtures thereof.

5. A liquid abrasive composition as claimed in claim 4 wherein the nonionic surfactant comprises coconut diethanolamide.

6. A liquid abrasive composition as claimed in claim 1 wherein the suspending agent is an inorganic complex silicate clay having the formula $(Si_8Mg_{5.1}Li_{0.6}H_{7.6}O_{24})^{0.6-}Na^{+}0.6$.

7. A liquid abrasive composition as claimed in claim 1 which contains approximately 55% by weight of the particulate abrasive.

8. A liquid abrasive composition as claimed in claim 1 which contains 4–5% by weight of the nonionic surfactant.

9. A liquid abrasive composition as claimed in claim 1 which contains 0.3 – 0.5% of the suspending agent.

10. A liquid abrasive composition as claimed in claims 1 which also contains a humectant.

11. A liquid abrasive composition as claimed in claim 10 which contains 0.5 – 5% by weight of the humectant.

12. A liquid abrasive composition as claimed in claim 1 which also contains at least one additive selected from coloring agents, perfumes, bleaching agents and germicides.

* * * * *